(12) United States Patent
Lee et al.

(10) Patent No.: US 6,323,755 B1
(45) Date of Patent: Nov. 27, 2001

(54) DYNAMIC BUS LOCKING IN A CROSS BAR SWITCH

(75) Inventors: William Robert Lee, Apex; David Wallach, Raleigh, both of NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/136,023

(22) Filed: Aug. 19, 1998

(51) Int. Cl.[7] ..................................... H04M 5/14
(52) U.S. Cl. ................. 340/14.69; 340/2.1; 709/209; 709/213; 710/131; 710/132; 710/200
(58) Field of Search .................. 340/825.79, 2.1, 340/14.69; 710/40, 131, 132, 200; 712/3, 4, 16, 18, 29; 348/57; 709/213, 209

(56) References Cited

U.S. PATENT DOCUMENTS

| | | |
|---|---|---|
| 4,148,011 | 4/1979 | McLagan et al. . |
| 4,818,985 | 4/1989 | Ikeda . |
| 4,987,529 | 1/1991 | Craft et al. . |
| 5,148,545 | 9/1992 | Herbst . |
| 5,191,656 | 3/1993 | Forde, III et al. . |
| 5,404,538 | 4/1995 | Krappweis . |
| 5,467,295 | 11/1995 | Young et al. . |
| 5,471,590 | 11/1995 | Melo et al. . |
| 5,506,998 * | 4/1996 | Kato et al. ............................ 712/29 |
| 5,528,767 | 6/1996 | Chen . |
| 5,555,425 | 9/1996 | Zeller et al. . |
| 5,555,543 | 9/1996 | Grohoski . |
| 5,572,734 | 11/1996 | Narad et al. . |
| 5,588,152 * | 12/1996 | Dapp et al. ............................ 712/16 |
| 5,596,729 | 1/1997 | Lester . |
| 5,689,657 | 11/1997 | Desor et al. . |
| 5,805,821 * | 9/1998 | Saxena et al. ...................... 709/213 |
| 5,959,689 * | 9/1999 | De Lange et al. .................... 348/57 |

\* cited by examiner

*Primary Examiner*—Michael Horabik
*Assistant Examiner*—Yves Dalencourt
(74) *Attorney, Agent, or Firm*—Sawyer Law Group LLP

(57) ABSTRACT

A cross-bar switch which includes a plurality of master bus ports, the master bus ports adapted to receive a plurality of master buses; a plurality of slave bus ports, the slave bus ports adapted to receive a plurality of slave buses; a switching mechanism for selectively coupling the plurality of master bus ports to the plurality of slave bus ports; and a configuration mechanism for locking at least one of the plurality of slave buses in response to a transfer request initiated by a master device attached to one of the plurality of master buses. The cross-bar switch has the capability of selectively locking slave buses during a bus lock transfer. In the preferred embodiment, the configuration mechanism is a Bus Lock Bit on Configuration Registers on the cross-bar switch. The Bus Lock Bit is programmable through the Device Control Register bus, which allows the cross-bar switch to be dynamically programmable and changed by a processor in a larger system. The cross-bar switch minimizes the cycle latency between data transfers. This improves the bandwidth and throughput on the on-chip bus.

4 Claims, 3 Drawing Sheets

DYNAMIC BUS LOCKING IN A CROSS BAR SWITCH

FIELD OF INVENTION

The present invention relates to bus arbitration in computer systems, and more specifically to bus locking in a cross-bar switch.

BACKGROUND

Significant advances in silicon densities have allowed for the integration of many functions onto a single silicon chip. With this increased density, many of the peripherals in a computer system that were normally attached to the processor via an external bus now are attached via an on-chip bus. In addition, the bandwidth requirements of these on-chip buses are increasing due to the integration of various audio, video, and graphic functions along with the processor. As a result, providing maximum on-chip bus performance is desired.

FIG. 1 illustrates a conventional on-chip bus architecture 100, containing an on-chip bus 120 and bus arbiter 140. The on-chip bus 120 supports read and write data transfers between master devices 110 and slave devices 130 equipped with an on-chip bus interface. A "master" device is one which requests access to or control of the on-chip bus 120 and transmits and receives data across the on-chip bus 120. A "slave" device is one which transmits or receives data across the on-chip bus 120 and is responsive to a master. The slave may not request access to or control of the on-chip bus 120. Access to the on-chip bus 120 is granted through an arbitration mechanism 140, or arbiter, which is attached to the on-chip bus 120 and prioritizes all transfer requests from masters devices for bus ownership. Timing for all on-chip bus signals is provided by a single clock source (not shown). This single clock source is shared by all master devices and slave devices attached to the on-chip bus 120. The master device may operate at a different (higher) frequency. Synchronization logic may be implemented at the interface of the two clock domains.

One approach to maximizing the performance of the on-chip bus is to use multiple parallel high speed master and slave buses instead of a single bus as illustrated in FIG. 1. A mechanism, such as a cross-bar switch, is typically used to allow these buses to communicate with each other. Under conventional protocols, a master device may initiate a bus lock data transfer request which locks the bus from access by other master devices until the master device releases the bus. The release of the bus by the master device occurs when the master device which initiated the bus lock transfer, releases the bus. However, with a multiple parallel bus architecture, all slave buses would be locked during a bus lock transfer. While locked, these slave buses are allowed only to service requests from the master device which initiated the bus lock transfer, regardless of whether or not a slave bus is actually needed to service these requests. This results in increased latency for other master devices to gain access to the locked slave bus.

Accordingly, there exists a need for a method and system for providing a mechanism which has the capability of selectively locking slave buses during a bus lock transfer in a on-chip bus architecture with multiple parallel high speed buses. Such selective locking will allow only buses actually needed to service a master device's bus lock transfer to be locked while leaving the remainder of the slave buses free to service requests from other master devices. This method should minimize the latency between data transfers. The present invention addresses such a need.

SUMMARY

The present invention provides a cross-bar switch which includes a plurality of master bus ports, the master bus ports adapted to receive a plurality of master buses; a plurality of slave bus ports, the slave bus ports adapted to receive a plurality of slave buses; switching mechanism for selectively coupling the plurality of master bus ports to the plurality of slave bus ports; and a configuration mechanism for locking at least one of the plurality of slave buses in response to a transfer request initiated by a master device attached to one of the plurality of master buses. The cross-bar switch of the present invention has the capability of selectively locking slave buses during a bus lock transfer. In the preferred embodiment, the configuration mechanism is a Bus Lock Bit on Configuration Registers on the cross-bar switch. The Bus Lock Bit is programmable through the Device Control Register bus, which is separate from the on-chip buses, which allows the cross-bar switch of the present invention to be dynamically programmable and changed by a processor in a larger system. The cross-bar switch of the present invention minimizes the latency between data transfers. This improves the bandwidth and throughput on the on-chip bus.

DESCRIPTION

The present invention provides a method and system for selectively locking slave buses during a bus lock transfer across a cross-bar switch interfaced with multiple parallel buses. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the present invention, please refer to FIGS. 2 and 3 and the discussion below.

Figure 1:
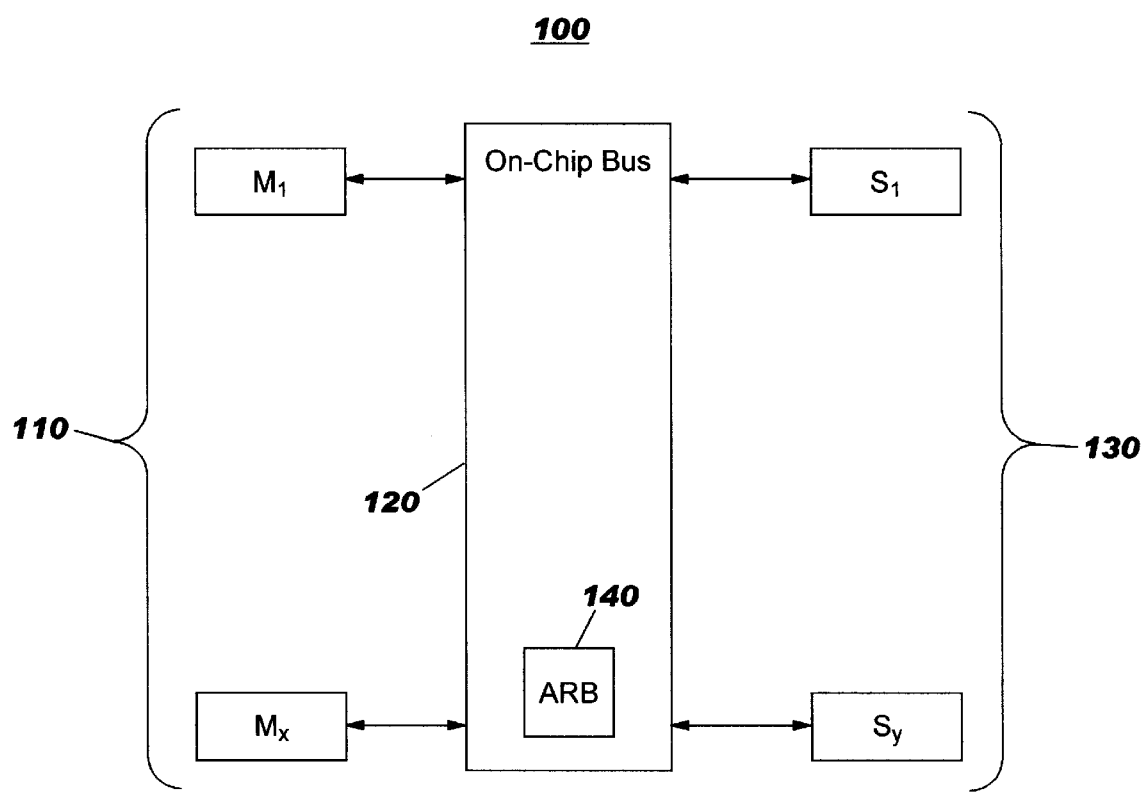
FIG. 1 is a block diagram of a conventional on-chip bus architecture.
Figure 2:
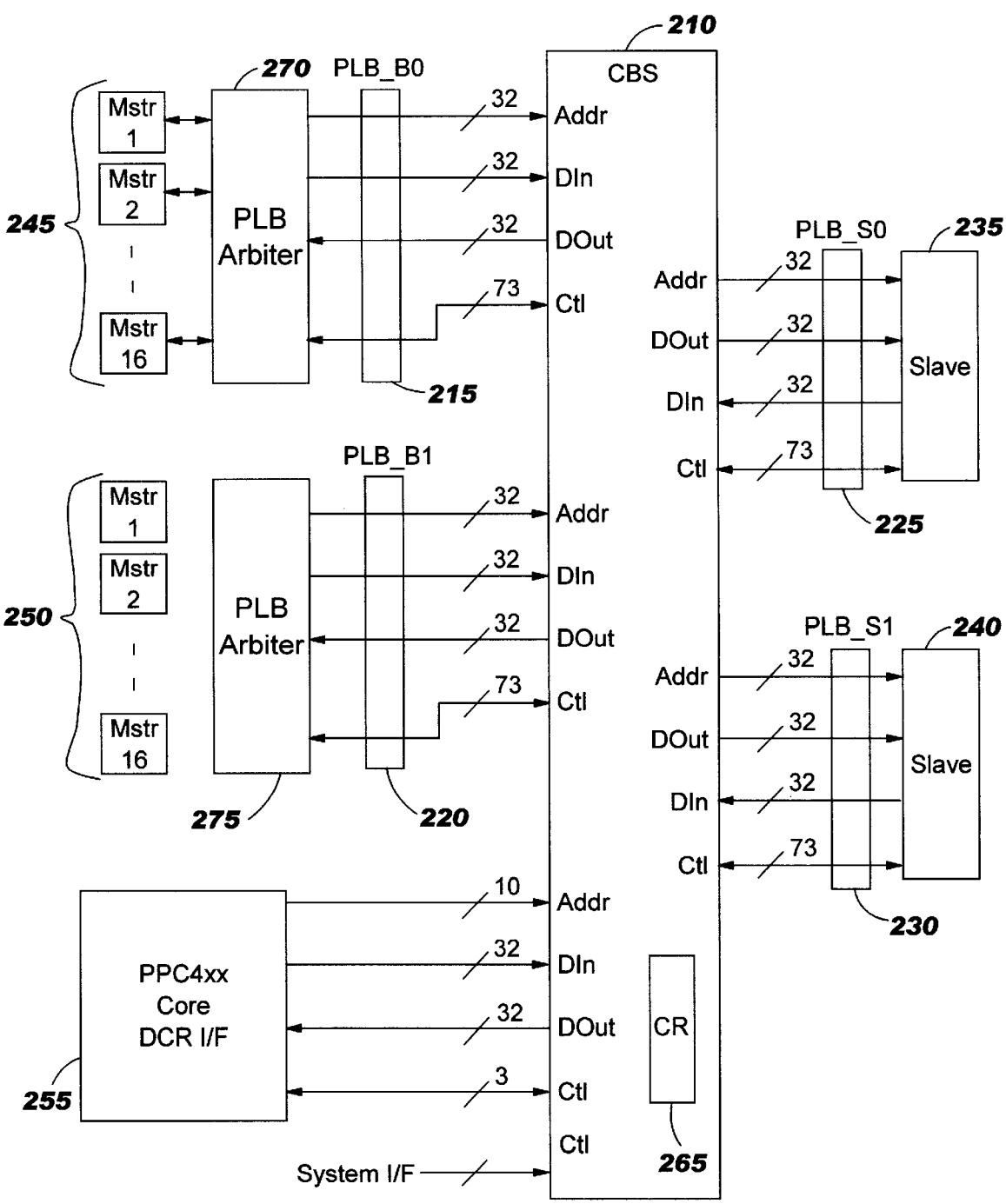
FIG. 2 is a block diagram of a cross-bar switch architecture in accordance with the present invention.

FIG. 2 illustrates a preferred embodiment of a cross-bar switch interface on a chip 200 for a method and system in accordance with the present invention. In this embodiment, the cross-bar switch (CBS) 210 is a PowerPC Local Bus CBS operating generally under the conventional PowerPC Local Bus (PLB) protocol, however, any CBS architecture may be used. The PLB protocols are known in the art and will not be discussed in detail in this specification. The preferred embodiment of the method in accordance with the present invention expands upon the PLB protocol.

The CBS 210 connects multiple parallel master buses 215 and 220 (PLB_B0 and PLB_B1 respectively), to multiple slave buses 225 and 230 (PLB_S0 and PLB_S1). Each master bus 215 and 220 is managed by its own arbiter 270 and 275 respectively. Interfaced with each arbiter 270 and 275 are a plurality of master devices 245 and 250 respectively. An arbiter prioritizes read/write requests which are asserted by the master devices interfaced with it. For example, arbiter 270 prioritizes read/write requests from any of the master devices 245 while arbiter 275 prioritizes requests from any of the master devices 250. Also interfaced with the CBS 210 is a Device Control Register (DCR) bus 255. The DCR bus 255 is used to move data between the CPU's General Purpose Registers (GPRs) and the CBS 210 DCR 255.

Although the preferred embodiment shows two master buses and two slave buses, one of ordinary skill in the art will understand that any number of slave buses and master buses operating in parallel may be used without departing from the spirit and scope of the present invention. For purposes of describing the features of the present invention, a bus architecture with two master buses and two slave buses will be used.

The CBS 210 allows the master buses 215, 220 to inter-communicate with the slave buses 225, 230. The CBS 210 decodes the address on the master buses 215, 220 and directs the transfer to the appropriate slave device. The CBS 210 allows all master devices connected to master bus 215 to request all transfer types from the slave devices on either slave bus 225 or slave bus 230. Similarly, all master devices attached to master bus 220 can request all transfer types from slave devices on either slave buses 225 or 230. Simultaneous data transfers can occur between each master device and each slave device.

Each master may make two types of read/write data transfer requests, a primary transfer request and a secondary pipelined transfer request. A primary request is one for which a bus transfer is started while the requested data bus is idle. A secondary request is one for which a bus transfer is started before a current bus transfer (primary) in the same direction is completed.

A problem occurs when a master bus, such as master bus 215, asserts a bus lock transfer request to a slave bus. If the bus lock transfer under the conventional protocols is used, both slave buses 225 and 230 will be locked once all conditions are met. Both slave buses would only be available to service requests form master bus 215. All other master bus requests are locked out. However, master bus 215 sometimes does not need both slave buses 225 and 230 to process its bus lock transfer, which results in latent cycles on at least one of the slave buses 225 or 230.

To minimize this latency, the preferred embodiment of the method of the present invention utilizes a Bus Lock Bit on Configuration Registers 265 on the CBS 210 to allow for the selective locking of slave buses, so that not all slave buses are locked during a bus lock transfer for a master bus, leaving some slave buses free to service requests from other master buses. The Configuration Registers 265 are disclosed in co-pending U.S. patent application entitled, "Low Latency Data Path in a Cross-Bar Switch Providing Dynamically Prioritized Bus Arbitration," Ser. No. 09/136,595, filed on Aug. 19, 1998. Applicant hereby incorporates this patent application by reference. The Configuration Registers 265, including the Bus Lock Bit, are programmable through the DCR 255. The DCR 255 interface allows the CBS 210 to be dynamically programmed and changed by a processor in a larger system.

In the preferred embodiment of the Bus Lock Bit of the present invention, if a master bus initiates a Bus Lock transfer to a slave bus, access only to that particular slave bus is locked until the bus lock transfer has concluded. The other slave bus is not locked until the master initiates a bus lock transfer request to a slave device attached to it. When the Bus Lock Bit is enabled, all slave buses will be locked during the initial bus lock transfer request, once conditions are met. This will lock out all other master bus requests until the master bus initiating the bus lock negates the bus lock signal. This prevents transfer requests from other master buses not servicing the initial bus lock transfer to occur and will be locked out. By selectively locking the slave buses in this manner, the Bus Lock Bit minimizes latency between data transfers.

For example, assume a master device attached to master bus 215 initiates a bus lock transfer to slave bus 225. The CBS 210 will lock slave bus 225 and block all transfer requests initiated from master bus 220 until the bus lock transfer completes and the master negates the bus lock signal. If during the bus lock transfer operation to slave bus 225, master bus 215 initiates a second transfer request to slave bus 230, the CBS 210 will also lock this bus. Otherwise, slave bus 230 will be available to service all transfer requests initiated by master bus 220.

Figure 3:
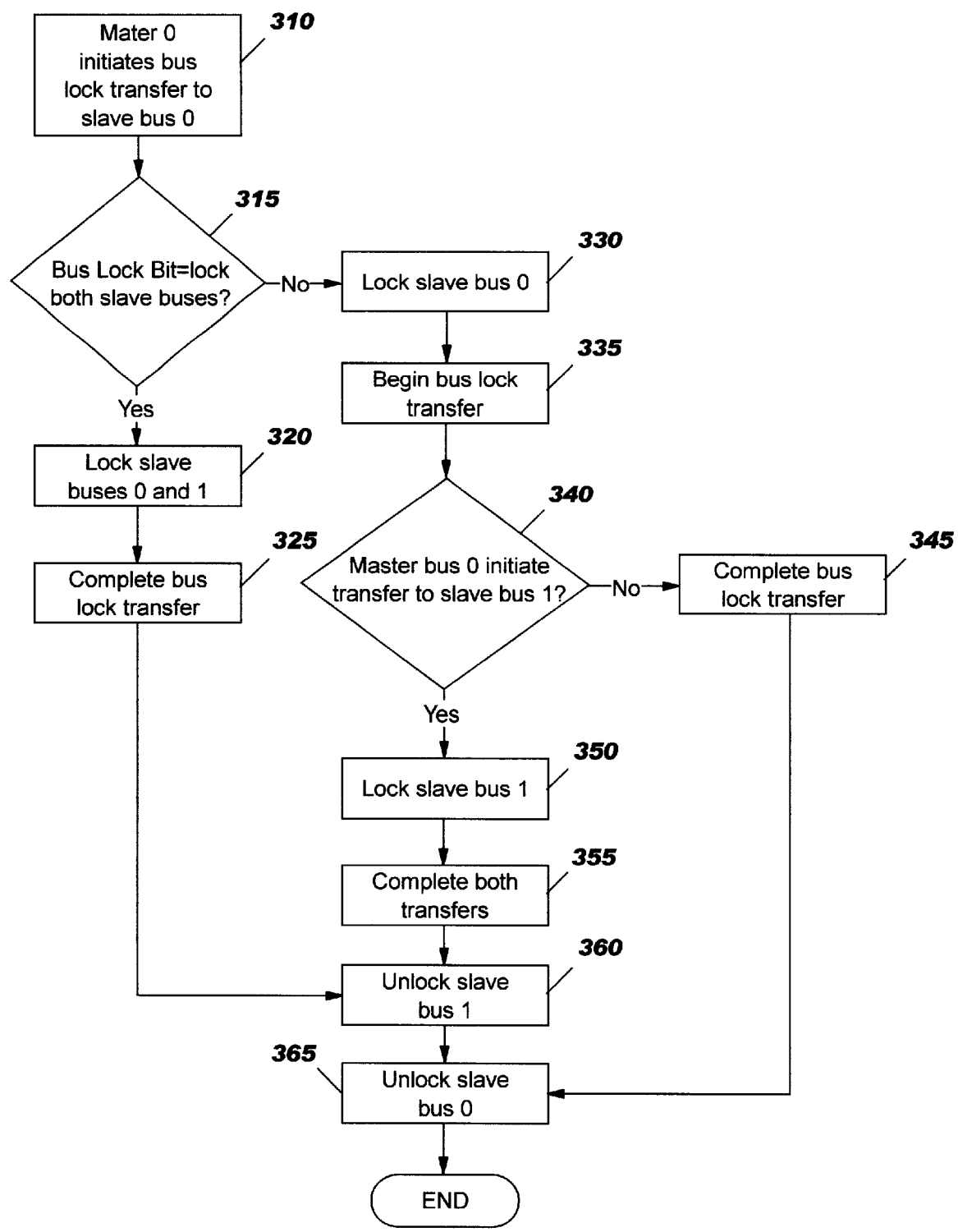
FIG. 3 is a flow chart illustrating a preferred embodiment of the bus locking protocol in accordance with the present invention.

FIG. 3 is a flow chart illustrating a preferred embodiment of the bus lock protocol in the method in accordance with the present invention. Assume that master bus 215 initiates a bus lock transfer to slave bus 225, via step 310, by asserting the bus lock signal along with its data transfer request. The CBS 210 first determines whether or not the Bus Lock Bit configures the CBS 210 to lock both slave buses 225 and 230 during bus lock transfers, via step 315. If so, then both slave buses 225 and 230 are locked, via step 320. Then the bus lock transfer is completed, via step 325. Once the transfer completes, master bus 215 negates its bus lock signal which unlocks the slave buses 225 and 230, via steps 360 and 365.

Returning to step 315, if the Bus Lock Bit does not configure the CBS 210 to lock both slave buses 225 and 230 during bus lock transfers, then only slave bus 225 is locked, via step 330. The slave bus then begins the requested bus lock transfer, via step 335. If master bus 215 initiates a second transfer to slave bus 230 during the bus lock transfer, via step 340, then slave bus 230 is also locked, via step 350. The slave buses 225 and 230 then completes their respective transfer requests, via step 355. Once completed, master bus 215 negates the bus lock signal and both slave buses 225 and 230 are unlocked, via steps 360 and 365.

Returning to step 340, if master bus 215 does not initiate a transfer request to slave bus 230 during the bus lock transfer, then slave bus 225 simply completes the bus lock transfer, via step 345. During this time, slave bus 230 remains unlocked and available to service transfer requests from master bus 220. Once the bus lock transfer completes, master bus 215 negates its bus lock signal which unlocks slave bus 225, via step 365.

Although the present invention has been described with the use of a Bus Lock Bit, one of ordinary skill in the art will understand that other methods for selectively locking slave buses can be used without departing from the spirit and scope of the present invention.

A method and system for providing a CBS which has the capability of selectively locking slave buses during a bus lock transfer in a on-chip bus architecture with multiple parallel high speed buses has been disclosed. This capability is accomplished through a Bus Lock Bit on Configuration Registers on the CBS. The Bus Lock Bit is programmable through the DCR, which allows the CBS of the present invention to be dynamically programmable and changed by a processor in a larger system. By selectively locking slave buses, other slave buses not servicing the bus lock transfer are available to service other requests. This minimizes the latency between data transfers and improves the bandwidth and throughput on the on-chip bus.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A cross-bar switch comprising:
    a plurality of master bus ports, the plurality of master bus ports receives a plurality of parallel master buses;
    a plurality of slave bus ports, the plurality of slave bus ports receives a plurality of parallel slave buses;
    switching means for selectively coupling the plurality of parallel master buses to the plurality of parallel slave buses; and
    configuration means for locking at least one of the plurality of parallel slave buses in response to a transfer request initiated by a master bus, wherein the configuration means comprises a Bus Lock Bit on Configuration Registers on the switching means.

2. A cross-bar switch comprising:
    a plurality of master bus ports, the plurality of master bus ports receives a plurality of parallel master buses;
    a plurality of slave bus ports, the plurality of slave bus ports receives a plurality of parallel slave buses;
    switching means for selectively coupling the plurality of parallel master buses to the plurality of parallel slave buses; and
    configuration registers on the switching means for locking at least one of the plurality of parallel slave buses in response to a bus lock transfer request initiated by a master bus, wherein the configuration registers comprises a Bus Lock Bit which configures the cross-bar switch to lock only the slave bus servicing the transfer request initiated by the master bus.

3. A system for providing a cross-bar switch, comprising:
    means for providing a plurality of master bus ports, the plurality of master bus ports receives a plurality of parallel master buses;
    means for providing a plurality of slave bus ports, the plurality of slave bus ports receives a plurality of parallel slave buses;
    switching means for selectively coupling the plurality of parallel master buses to the plurality of parallel slave buses; and
    configuration means for locking at least one of the plurality of parallel slave buses in response to a transfer request initiated by a master bus, wherein the configuration means comprises a Bus Lock Bit on Configuration Registers on the switching means.

4. A computer readable medium with computer instructions for providing a cross-bar switch, the computer instructions for:
    (a) providing a plurality of master bus ports, the plurality of master bus ports receives a plurality of parallel master buses;
    (b) providing a plurality of slave bus ports, the plurality of slave bus ports receives a plurality of parallel slave buses;
    (c) providing a switching means for selectively coupling the plurality of parallel master buses to the plurality of parallel slave buses; and
    (d) providing a configuration means for locking at least one of the plurality of parallel slave buses in response to a transfer request initiated by a master bus, wherein the configuration means comprises a Bus Lock Bit on Configuration Registers on the switching means.

* * * * *